United States Patent
Blom et al.

(10) Patent No.: US 8,990,563 B2
(45) Date of Patent: Mar. 24, 2015

(54) SENDING PROTECTED DATA IN A COMMUNICATION NETWORK

(75) Inventors: Rolf Blom, Jarfalla (SE); John Mattsson, Taby (SE); Oscar Ohlsson, Huddinge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 355 days.

(21) Appl. No.: 13/155,822

(22) Filed: Jun. 8, 2011

(65) Prior Publication Data
US 2012/0066496 A1    Mar. 15, 2012

Related U.S. Application Data

(60) Provisional application No. 61/383,092, filed on Sep. 15, 2010.

(51) Int. Cl.
| | |
|---|---|
| H04L 9/32 | (2006.01) |
| H04L 29/06 | (2006.01) |
| H04L 9/08 | (2006.01) |
| H04W 12/04 | (2009.01) |
| H04W 12/06 | (2009.01) |

(52) U.S. Cl.
CPC ............ *H04L 63/062* (2013.01); *H04L 9/0827* (2013.01); *H04L 9/083* (2013.01); *H04L 9/3213* (2013.01); *H04L 63/0807* (2013.01); *H04W 12/04* (2013.01); *H04W 12/06* (2013.01)
USPC ........... 713/168; 713/170; 713/171; 380/277; 380/278; 726/10

(58) Field of Classification Search
CPC ..... H04L 9/0827; H04L 9/083; H04L 9/3213; H04L 63/062; H04L 63/0807; H04W 12/04
USPC .............. 713/168, 170, 171; 380/277, 278; 726/10
See application file for complete search history.

(56) References Cited

U.S. PATENT DOCUMENTS

| | | | | |
|---|---|---|---|---|
| 2009/0070586 | A1* | 3/2009 | Bucker et al. ................ | 713/171 |
| 2009/0083538 | A1* | 3/2009 | Merugu et al. .............. | 713/153 |
| 2009/0119504 | A1* | 5/2009 | van Os et al. ............... | 713/153 |

(Continued)

OTHER PUBLICATIONS

"4.1 Usage models", 3GPP Draft; S3-090072_Update_System_Description, 3rd Generation Partnership Project (3GPP), Mobile Competence Centre, 650, Route Des Lucioles; F-06921 Sophia-Antipolis Cedex, France, no. Florence, Jan. 12, 2009, XP050334754, 5 pages.

(Continued)

*Primary Examiner* — Baotran N To
(74) *Attorney, Agent, or Firm* — Rothwell, Figg & Ernst & Manbeck, P.C.

(57) ABSTRACT

A method and apparatus for sending protected data from a sender unit to a receiver unit via an intermediate unit. A Transfer Init message that contains a ticket associated with the receiver unit is sent from the intermediate unit to the sender unit. The intermediate unit then receives a transfer response message from the sender unit, and also data which has been protected using at least one security key associated with the ticket and obtained from a Key Management Server. A message is sent to the receiver unit, the message including information required for security processing of the protected data. The protected data is then sent to the receiver unit, allowing the receiver unit to access the protected data.

19 Claims, 5 Drawing Sheets

(56) References Cited

U.S. PATENT DOCUMENTS

2010/0293380 A1* 11/2010 Wiseman et al. ............. 713/169
2011/0170694 A1* 7/2011 Brusilovsky et al. ......... 380/278

OTHER PUBLICATIONS

ZTE Corporation et al., "pCR to TR33.828: Update of "Otway-Rees" Deferred Delivery and Resolving Edirot's Notes", 3GPP Draft; PCR_or_Update_Deferred Delivery 1, (3GPP), Mobile Competence Centre, 650, Route Des Lucioles; F-06921 Sophia-Antipolis Cedex, France, no. Seattle, Jun. 29, 2009 XP050356411, 3 pages.
J. Mattsson, Ericsson et al., "MIKEY-Ticket: Ticket Based Modes of Key Distribution in Multimedia Internet KEYing (MIKEY); draft-mattsson-mikey-ticket-05.txt", MIKEY-Ticket: Ticket Based Modes of Key Distribution in Multimedia Internet Keying (MIKEY); Draft-Mattsson-MIKEY-Ticket-05, TXT, Internet Engineering Task Force, IETF; Standardworkingdraft, Internet Society (ISOC) 4, Rue Des Falaises CH-1205 Geneva, No. 5, Jun. 8, 2010, XP015068839, pp. 1-56.
"Universal Mobile Telecommunications System (UMTS); LTE; IP Multimedia Subsystem (IMS) media plane security (3GPP TS 33.326 version 9.1.0 Release 9)" Technical Specification, European Telecommunications Standards Institute (ETSI), 650, Route Des Lucioles; F-06921 Sophia-Antipolis, France, vol. 3GPP SA 3, No. V9.1.0, Apr. 1, 2010, XP014046855, 43 pages.
Blom, R., et al., Ericsson, "SRTP Store-and-Forward use Cases and Requirements; draft-mattsson-srtp-store-and-forward-0.3.t xt", SRTP Store-and Forward Use Cases and Requirements; Draft-Mattsson-SRTP-Store-and-Forward-03.T XT, Internet Engineering Task Force, IETF; Standardworking Draft, Internet Society (ISOC) 4, Rue Des Falaises CH-1205 Geneva, Switzerland, vol. K, No. 3, Jul. 6, 2009, XP015063211, 23 pages.
International Search Report and Written Opinion issued on Sep. 6, 2011, in corresponding PCT application No. PCT/EP2011/059447, 13 pages.
Written Opinion of the International Preliminary Examining Authority dated Aug. 31, 2012 from corresponding application No. PCT/EP2011/059447, 6 pages.

* cited by examiner

SENDING PROTECTED DATA IN A COMMUNICATION NETWORK

TECHNICAL FIELD

The present invention relates to sending protected data in a communication network, and in particular to sending protected data via an intermediate node

BACKGROUND OF THE INVENTION

The IP Multimedia Subsystem (IMS) is the technology defined by the Third Generation Partnership Project (3GPP) to provide IP Multimedia services over mobile and fixed communication networks. IP Multimedia services provide a dynamic combination of voice, video, messaging, data, etc. within the same session.

The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1 control of communications occurs at three layers (or planes). The lowest layer is the Connectivity Layer 1, also referred to as the bearer plane and through which signals are directed to/from user equipment, UE, accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A gateway GPRS support node (GGSN) 2a acts as an interface between the GPRS backbone network and other networks (radio network and the IMS network). The middle layer is the Control Layer 4, and at the top is the Application Layer 6.

The IMS 3 includes a core network 3a, which operates over the Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5, which operate as SIP proxies within the IMS in the, Control Layer 4. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (ASs) 7 are provided for implementing IMS service functionality.

IMS networks are capable of providing many different services, from basic telephony to much more sophisticated multimedia services. For some services, it is desirable to introduce an intermediate node between the sender and the receiver. Examples of such situations include the use of store-and-forward mailboxes, network answering machines, and caching of IPTV content for more efficient, local access to content.

In this case, the intermediate node must be able to resend received data using an independent session using new session parameters. In cases where the data is encrypted or otherwise protected, the intermediate node should not have access to the plaintext data, although it should be able to check the integrity of each packet of the data in order not to waste storage space on non-authentic content. In order to establish an independent session using new session parameters, the intermediate node would normally need to decrypt and re-encrypt each packet of the data, and this is unacceptable from a security point of view.

IMS media plane security has been standardized in 3GPP, TS 33.328. For high security end-to-end protection in 3GPP, a Ticket based key management system MIKEY-TICKET is introduced, as described in RFC 3711. However, there is no key management solution for store-and-forward applications in an IMS media plane which is based on MIKEY-TICKET.

SUMMARY OF THE INVENTION

According to a first aspect, there is provided a method of sending protected data from a sender unit to a receiver unit via an intermediate unit. The intermediate unit sends (S1) a Transfer Init message to the sender unit. The Transfer Init message contains a ticket associated with the receiver unit. The intermediate unit then receives a transfer response message from the sender unit. The intermediate unit then receives data from the sender unit, the data having been protected using at least one security key associated with the ticket and obtained from a Key Management Server. The intermediate unit then sends to the receiver unit a message, the message including information required for security processing of the protected data, and sends the protected data to the receiver unit. Examples of security processing include decryption of the protected data and verification of the protected data. The method provides a ticket based solution that allows the sender unit to send protected data to the receiver unit via an intermediate unit without the intermediate unit being able to access the protected data.

As an option, the sender unit, after receiving the Transfer Init message, sends a resolve request message to the Key Management Server, the resolve request message requesting the Key Management Server to resolve the security key associated with the ticket. The sender unit subsequently receives a resolve response message from the Key Management Server, the resolve response message including the security key associated with the ticket.

Optionally, the receiver unit sends a ticket resolve message to the Key Management Server, and subsequently receives a resolve response message from the Key Management Server, the resolve response message including the security keys. This allows the receiver to perform security processing on the protected data.

Prior to the intermediate unit sending the Transfer Init message to the sender unit, the receiver node optionally sends a ticket request message to the Key Management Server, the ticket request message including an identity associated with the sender unit. The receiver node subsequently receives from the Key Management Server the ticket and security keys and generates the Transfer Init message, which is then sent to the intermediate unit. The ticket request message may include an indication that the ticket is to be used for a store-and-forward application, or the ticket may optionally be bound to the intermediate node.

Prior to the intermediate unit sending the Transfer Init message to the sender unit, the receiver node optionally generates the ticket and security keys and the receiver node generates the Transfer Init message, which is sent to the intermediate unit.

The Key Management Server optionally receives a ticket resolve message from the receiver unit, and determines that a Responder payload in the ticket resolve message corresponds with an Initiator payload in the ticket. As a result of the determination, the KMS sends a resolve response message to the receiver unit, the resolve response message including unforked security keys.

As an option, and prior to the intermediate unit sending the Transfer Init message to the sender unit, the intermediate unit sends a ticket request message to the Key Management Server for the ticket, the ticket request message including an identity of the sender unit and an indicator that the intermediate unit is entitled to request a ticket on behalf of the receiver unit, and subsequently receives the ticket from the Key Management Server.

According to a second aspect, there is provided an intermediate unit for receiving protected data on behalf of a receiver unit and sent from a sender unit, in a communication network. The intermediate unit is provided with a first transmitter for sending to the sender unit a Transfer Init message, the Transfer Init message containing a ticket associated with the receiver unit. A first receiver is provided for receiving a transfer response message from the sender unit. A second receiver is provided for receiving data from the sender unit, the data being protected using a security key associated with the ticket and obtained from a Key Management Server. A second transmitter is provided for sending to the receiver unit a message, the message including information required for security processing of the protected data, and a third transmitter is provided for sending the protected data to the receiver unit.

As an option, the intermediate unit further comprises a fourth transmitter for sending a ticket request message to the Key Management Server for the ticket, the ticket request message including an identity of the sender unit and an indicator that the intermediate unit is entitled to request a ticket on behalf of the receiver unit. In this case the intermediate unit is also provided with a third receiver for receiving the ticket from the Key Management Server.

According to a third aspect, there is provided a receiver unit for use in a communication network in which a sender unit sends protected data to the receiver unit via an intermediate unit. The receiver unit is provided with a first receiver for receiving from the intermediate unit a message including a ticket associated with the receiver unit. A second receiver is provided for receiving the protected data from the intermediate unit. A transmitter is provided for sending a request message to a Key Management Server, and a third receiver is provided for receiving a response message from the Key Management Server. The response message includes security keys which can be used by a processor for applying a security processing to the protected data.

According to a fourth aspect, there is provided a sender unit that is provided with a first receiver for receiving from the intermediate unit a Transfer Init message. The Transfer Init message contains a ticket associated with the receiver unit. A first transmitter is provided for sending a resolve request message to a Key Management Server, the resolve request message requesting the Key Management Server to resolve a security key associated with the ticket. A second receiver is provided for receiving a resolve response message from the Key Management Server. The resolve response message includes a security key associated with the ticket. A processor is provided for protecting data using the security key. A second transmitter is provided for sending a transfer response message to the intermediate unit, the transfer response message including the ticket, and a third transmitter is provided for sending the protected data to the intermediate unit.

According to a fifth aspect, there is provided a computer program, comprising computer readable code which, when run on an intermediate unit, causes the intermediate unit to perform the method described above in the first aspect.

According to a sixth aspect, there is provided a computer program, comprising computer readable code which, when run on a receiver unit, causes the receiver unit to behave as a receiver unit as described above in the third aspect.

According to a seventh aspect, there is provided a computer program comprising computer readable code which, when run on a sender unit, causes the sender unit to behave as a sender unit described above in the fourth aspect.

According to further aspects, there is provided a computer program product comprising a computer readable medium and a computer program stored on the computer readable medium, the computer program being one as described above in any of the fifth, sixth or seventh aspects.

DETAILED DESCRIPTION OF THE INVENTION

The following description assumes sending protected media data via an intermediate node in an IMS network. However, it will be appreciated that the invention may be applied to other types of communication network, and may also apply to types of data other than media data. The following description uses the same notation as that described in MIKEY-TICKET, draft-mattsson-mikey-ticket-05.

MIKEY-TICKET is a Ticket based solution to securing data sent between two nodes. This solution relies on a Key Management Server (KMS), and so there is no need to pre-establish security credentials between nodes, as nodes can request such credentials from a KMS (or more than one KMS) as required. To summarize a basic mode of the key management system where no intermediate node is involved, when a sender wishes to send data to a receiver, it requests a Ticket from the KMS. The KMS responds with a Ticket, which the sender sends to the receiver. The receiver sends the Ticket to the KMS server, which responds to the receiver with corresponding keys for use in protecting the data. The Ticket may contain keys for use in protecting the data, but these keys cannot be accessed without contacting the KMS for the KMS to "resolve" the ticket and respond with the keys.

The present invention used MIKEY-TICKET to distribute keys from a KMS in such a way that a sender can send data to an intermediate node, and the receiver can subsequently receive the data from the intermediate node, without the intermediate node being able to access the plain text data.

Figure 1:
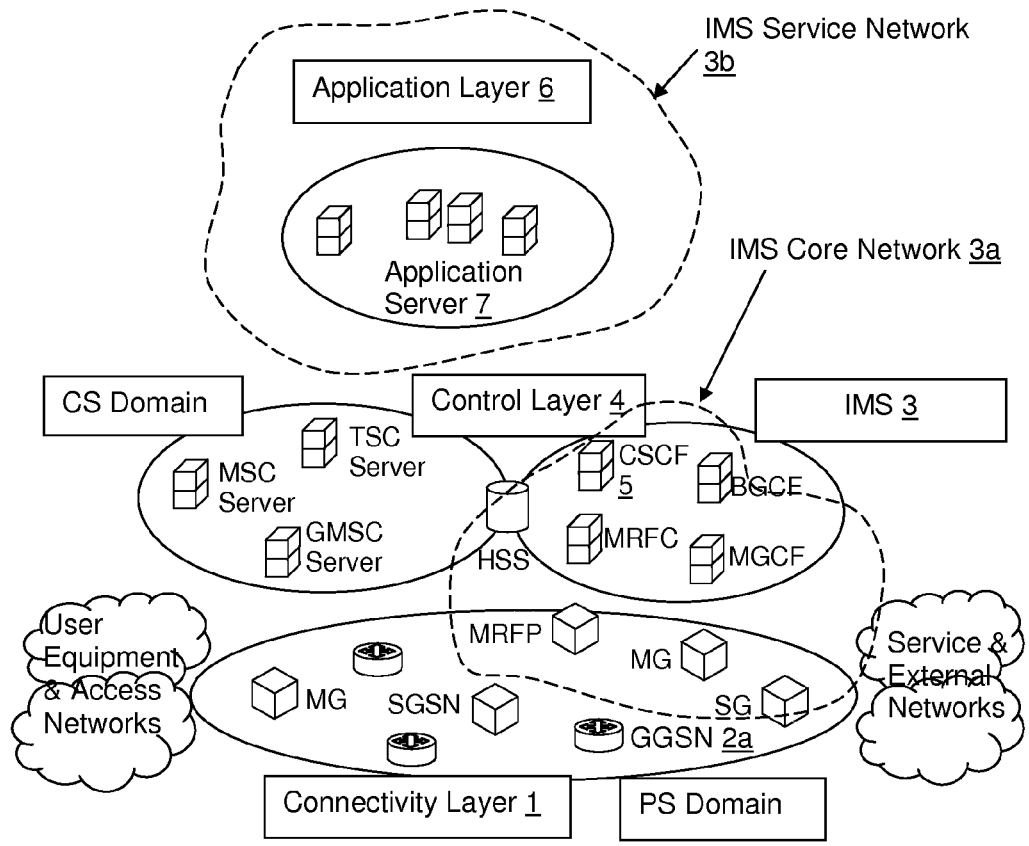
FIG. 1 illustrates schematically in a block diagram an IMS network in association with a mobile network architecture of a General Packet Radio Service (GPRS) access network.
Figure 2:
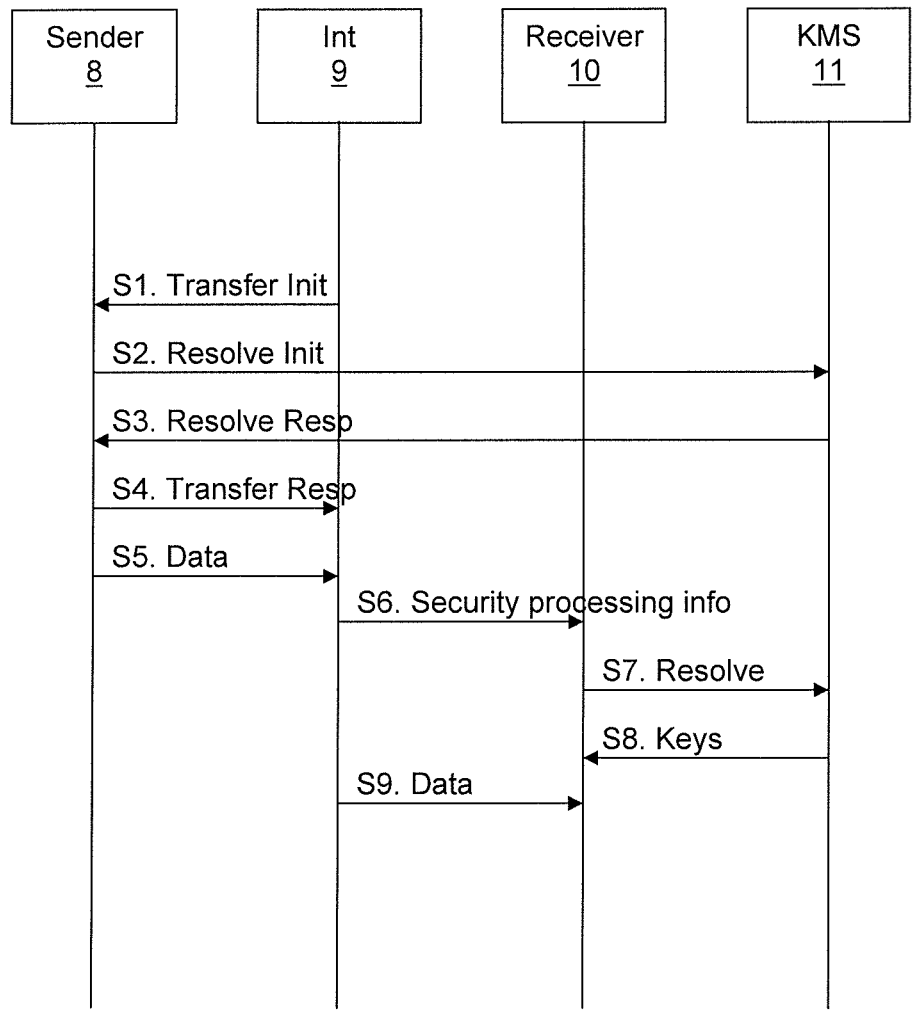
FIG. 2 is a signalling diagram showing the signalling according to an embodiment of the invention.

Referring to FIG. 2, a sender 8, and intermediate node 9, a receiver 10 and a KMS 11 are shown. In this signalling example, the sender 8 attempts to establish a communication with the receiver 10, but is instead transferred to an intermediate node 9 (which may, for example, be a voicemail node).

After sender 8 has attempted to establish a call with the receiver 10, and has been redirected to the intermediate node 9, the following steps occur:

S1. The intermediate node sends a Transfer Init message to the sender 8. The Transfer Init message contains a Ticket defining security keys to be used for keying the security functions used to end to end (e2e) protect data between the sender 8 and the receiver 10. In some cases, the intermediate node 9 stores all of the information that the receiver 10 requires to derive e2e keys and check messages.

S2. After receiving the Transfer Init message, the sender 8 behaves (in principle) as a Responder according to the MIKEY-TICKET standard. The sender 8 sends a Ticket Resolve Init to the KMS 11.

S3. The KMS 11 responds to the Ticket resolve request with a Resolve Resp, allowing the sender 8 to resolve the Ticket and check the Transfer Init message. The sender 8 then generates a Transfer Resp message.

S4. The sender 8 sends the Transfer Resp message to the intermediate node 9, which stores the Transfer Resp message. The Transfer Resp message includes information required for generation of keys.

S5. The sender can then send data to the intermediate node 9 that was originally intended for the receiver 10.

S6. When the receiver 10 contacts the intermediate node 9 to receive the data from the sender (for example, this may be in response to the intermediate node 8 sending a message to the receiver 10 informing the receiver 10 that it has a message waiting), the intermediate node 9 transfers to the receiver 10 the stored information that can be used for security processing of the message (for example decryption information or information for verifying the data in the message) needed by the receiver to generate the required e2e keys. This message includes the Transfer Resp message and may also contain part of, or all of the Transport Init message.

S7. If the receiver does not already possess the keys defined by the Ticket in the Transfer Init message, then the receiver performs a Ticket Resolve exchange by sending a Resolve request for the keys associated with the Ticket to the KMS 11.

S8. The KMS 11 sends the requested keys to the receiver 10. Note that steps S7 and S8 are optional, and only required if the receiver 10 does not already possess the keys defined in the Ticket.

S9. The receiver 10 can now receive and decrypt data sent from the intermediate node 9.

The Transfer Init message sent from the intermediate node 9 to the sender 8 may be either a Transfer Init message generated by the receiver 10 which the receiver 10 has transferred to the intermediate node 9 and is stored at the intermediate node 9, or it may be a message generated on the fly by the intermediate node 9.

Figure 3:
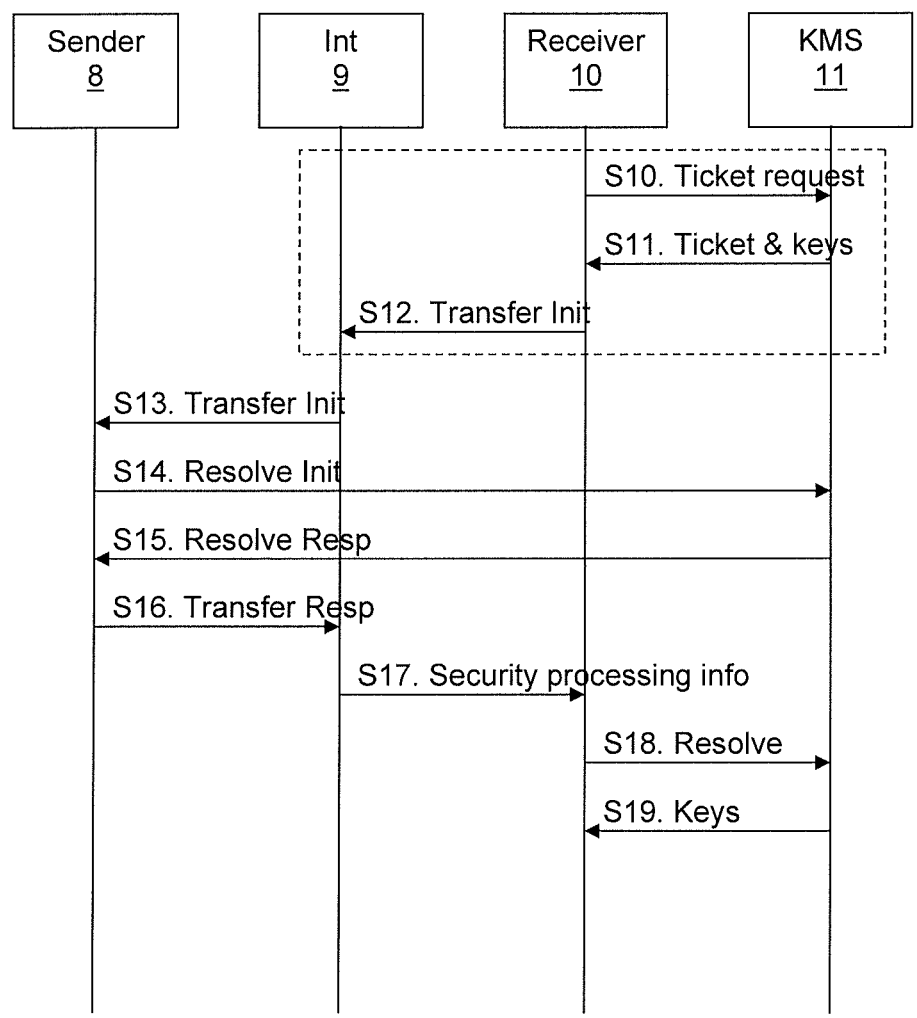
FIG. 3 is a signalling diagram showing signalling including providing a Ticket to an intermediate node according to an embodiment of the invention.

FIG. 3 shows the signalling required for the first scenario described above, in which the Transfer Init message is generated by the receiver 10, sent to the intermediate node 9, and is stored at the intermediate node 9. A typical example of use here is when the intermediate node 9 is a mailbox that the receiver regularly uses.

The dashed box of FIG. 3 highlights the signalling during a setup phase (steps S10 to S12). The following numbering corresponds to the numbering of FIG. 3:

S10. In order for the intermediate node 9 to receive a Transfer Init, the receiver 10 sends a Ticket request in the form of a Request Init to the KMS 11. Responder payloads (IDRr) included in the Request Init define the group of responders (e.g. the sender 8) that are authorized to use the e2e protected store-and-forward intermediate node 9 using the Ticket. It is beneficial from a security point of view (although not necessary) for the receiver 10 to indicate that the Ticket will be used for store-and-forward purposes. Such an indication may be implemented by using a special format for an IDRi in the Request Init. Another option is to allow two IDRis, one for the receiver 10, and a further one for the intermediate node 9. It is also beneficial (although not necessary) to bind the Ticket to the intermediate node 9.

S11. The KMS 11 generates keys and a Ticket, and sends the Ticket and the keys to the receiver 10 in a Request Resp message.

S12. The receiver 10 generates a Transfer Init message that includes the Ticket, and sends it to the intermediate node 9. The IDRr in the Transfer Init defines a subset of group of the payloads (IDRr) in the Ticket. The intermediate node 9 stores the Transfer Init message. Note that the receiver 10 may store the complete Transfer Init message, as it is later needed to verify a MAC in the Transfer Resp message described above. If the receiver does not store the Transfer Init message, it must be sent from the intermediate node 9 to the receiver 10 when the receiver 10 requires it. There are several reasons why the receiver might not store the transfer Init message, examples of which include the receiver losing access to its storage or a user wishing to listen to his mailbox from a terminal other than his usual receiver.

If the receiver 10 contacts the intermediate node 9 to set up a service provided by the intermediate node 9 (for example, if the intermediate node 9 is a voicemail box), the intermediate node 9 may retrieve other information, such as the capabilities and configuration of the receiver 10, needed for efficient operation and to guarantee interoperability between the sender 8 and the receiver 10. Note also that the receiver 10 may alternatively create the Ticket without assistance from the KMS 11, as described by mode 3 in MIKEY-TICKET, draft-mattsson-mikey-ticket-05.

When the sender 8 attempts to establish a communication session with the receiver 10, the communication session is diverted to the intermediate node 9. The following steps then apply:

S13. The intermediate node 9 sends the stored Transfer Init message (that has previously been generated by the receiver 10 to the sender 8.

S14. The sender 8 receives the Transfer Init message and makes a first check. The sender may verify that the Ticket is a store-and-forward Ticket and/or that it is issued to the intermediate node 9 on behalf of the receiver 10. Note that a Ticket timestamp will need to be handled in a non-standard way, although this is outside the scope of this invention. The sender 8 then performs a normal Resolve Init by sending a Resolve Init to the KMS 11.

S15. The KMS 11 performs a normal Resolve Resp and delivers forked keys to the sender 8. Keys may be forked where, for example, the Transfer Init message may be reused for one of many senders.

S16. The sender 8 generates a Transfer Resp message and sends it to the intermediate node 9. A Crypto Session Bundle (CSB) ID is used to link the Transfer Init message with the Transfer Resp message, and the intermediate node 9 stores the Transfer Resp message.

S17. When the receiver 10 wishes to receive the message, it contacts the intermediate node 9, which sends the stored Transfer Resp message to the receiver 10, that contains security processing information. It may be that the user of the receiver 10 has access to several terminals, any one of which may act as a receiver 10. In this case, whichever receiver is used, it must have access to all the information needed for message checking and e2e key generation, in other words the complete Transfer Init message.

S18. The receiver 10 receives the Transfer Resp message, and may also receive the entire or parts of the Transfer Init message. If the receiver 10 has not stored the keys defined by the Ticket, the receiver 10 sends a Resolve request to the KMS 11 for the keys by sending a Resolve Init message using the identity IDRi (identity of peer that requested or created the Ticket) as the IDRr identity in the Resolve Init message.

S19. The KMS 11 receives the Resolve Init and checks that the IDRr payload in the Resolve Init message matches the IDRi payload in the Ticket (denoting the issuer). This triggers special handling in the KMS 11, which returns unforked keys to the receiver 10, which the receiver 10 uses to check the Transfer Resp message and generate e2e media protection keys. The receiver 10 can then receive the data from the intermediate node 9 and decrypt it using the e2e media protection keys.

Any node that is authorized to use the identity in the IDRi payload in the Ticket is allowed to retrieve all of the unforked keys. Note that if it is required that a message should be retrievable from the intermediate node 9 from any receiver terminal, then the IDRr payload in the Resolve Init must match the IDRi payload in the Ticket. If messages are only retrievable from a given terminal, then IDRi payload in the Ticket is set to an identity unique for that terminal.

Note that the special handling of a Resolve Init by the KMS 11 may also be conditional on the presence of an indication that the Ticket is generated for store-and-forward use.

This scenario requires that the receiver 10 transfers a complete Transfer Init message to the intermediate node 9. The intermediate node 9 stores the message and sends it unchanged to the sender 8 when it is necessary to establish e2e security. However, it does lead to some issues as follows:

A timestamp in the Transfer Init message may be outdated when it is received by the sender 8. The sender 8 may therefore be able to ignore the timestamp, an indication may be introduced into the Transfer Init message that the time stamp is not applicable so the sender 8 only uses Ticket validity to determines if the Transfer Init message is acceptable or not. Allowable clock skew is set by local policy, and so a very large clock skew for store-and-forward purposes may be set.

The IDRr payload in the Transfer Init message cannot contain the sender's 8 identity, as this linking is not known at the time when the Transfer Init message is generated. This can be addressed by using group identities or allowing wildcard identities, and ensuring that the IDRr payload is present in the Transfer Init message.

According to an alternative embodiment, the intermediate node 9 has access to a Ticket issued to the intermediate node 9 on behalf of the receiver 10. This Ticket is either requested or created by the receiver 10 and sent to the intermediate node 9, or the intermediate node 9 is authorized to request a Ticket from the KMS 11. The following description assumes that the intermediate node 9 is authorized to request Tickets from the KMS 11. The intermediate node 9 stores the Ticket and embeds it in a Transfer Init message, which is sent to the sender 8 when it is required to establish e2e security.

During setup, the capabilities and configuration of the receiver 10 are sent to the intermediate node 9 to allow the intermediate node 9 to generate Transfer Init messages containing parameters acceptable to the receiver 10. An exemplary way in which this information may be retrieved by the intermediate node 9 is when the receiver 10 initializes the secure intermediate node 9 service. The receiver 10 may also transfer credentials which the intermediate node 9 can use to prove that the intermediate node 9 is authorized to request Tickets on behalf of the receiver 10. Alternatively, information about authorization may be provided directly to the KMS 11.

Figure 4:
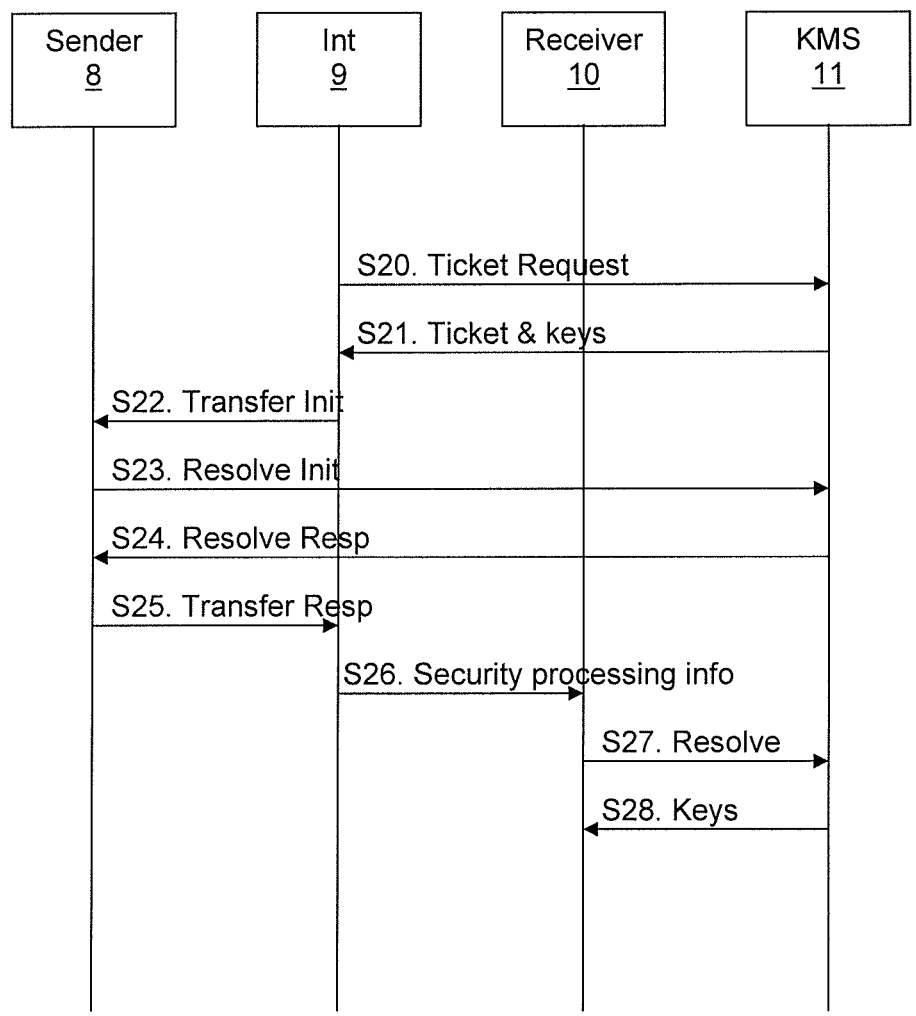
FIG. 4 is a signalling diagram showing the signalling including providing a Ticket to an intermediate node according to a further embodiment of the invention.

When the sender 8 attempts to establish a communication session with the receiver 10, the communication session is diverted to the intermediate node 9. Signalling is illustrated in FIG. 4, with the following numbering corresponding to that of FIG. 4.

S20. The intermediate node 9 requests a Ticket on behalf of the receiver 10 using a Request Init. To indicate that the Ticket has been issued to the intermediate node 9 on behalf of the receiver 10, the Request Init may have an IDRi payload with a specially formatted identifier, or it may have two IDRi payloads, one holding the intermediate node's 9 identity and one holding the receiver's 10 identity. The intermediate node 9 may be authorised to act on behalf of the receiver either by a policy at the KMS 11 or by presenting a credential issued by the receiver 10, for example a special delegating Ticket. Other credentials can also be used, for example certificates, SOAP, etc.

S21. The KMS 11 checks that the intermediate node 9 is authorized to request Tickets on behalf of the receiver 10 and, if so, generates the keys and the Ticket. The Ticket content indicates that it is issued to the intermediate node 9 on behalf of the receiver 10. The Ticket mandates forking and may be reusable. The KMS 11 sends the Ticket to the intermediate node 9 in a Request Resp message. The message is, in principle, a standard Request Resp message according to MIKEY-TICKET, but it does not include any e2e media protection keys.

S22. The intermediate node 9 then generates a Transfer Init message that includes the Ticket according to MIKEY-TICKET and sends it to the sender 8.

S23. The sender performs a Resolve Request by sending a Resolve Init to the KMS 11.

S24. The KMS 11 sends a Resolve Resp to the sender, which includes Traffic Encryption Keys (TEKs) forked Traffic Generation Keys (TGKs) and MIKEY Protection Keys (MPKs) in the Resolve Resp.

S25. The sender 8 may generate a Responder random number (RANDRr). The sender 8 then sends a Transfer Resp to the intermediate node 9. The intermediate node 9 checks that the sender 8 is the correct sender and, if the intermediate node 9 has access to the MPKr, the intermediate node 9 verifies the Transfer Resp message. The intermediate node 9 stores all of the information in the Transfer Resp, which it must forward to the receiver 10 to enable the receiver 10 to derive the media protection keys and media protection set-up (HDR, SP, RANDRr, RANDRkms, and IDRr). This may also be achieved by storing the entire Transfer Resp message.

S26. The intermediate node 9 generates a modified Transfer Init, or if it is simpler a modified Transfer Resp, or possibly resends the Transfer Init together with the newly generated Transfer Resp message. The message(s) would have to include the Ticket, all RANDs, IDRs and other information needed for e2e key generation or other information required for security processing of the message. If the intermediate node 9 simply forwards the Transfer Resp message that it previously received from the sender 8, then the intermediate node 9 must also forward the Transfer Init message that it sent to the sender 8, in order to allow the receiver 10 to check the integrity of the Transfer Resp message.

S27. The receiver 10 receives the Transfer Resp message and may also receive the entire or parts of the Transfer Init message. If the receiver 10 has not stored the keys defined by the Ticket, the receiver 10 sends a request to the KMS 11 for the keys by sending a Resolve Init message using the identity IDRi (identity of peer that requested or created the Ticket) as the IDRr identity in the Resolve Init message.

S28. The KMS 11 receives the Resolve Init and checks that the IDRr payload in the Resolve Init message matches the IDRi payload in the Ticket (denoting the issuer). This triggers special handling in the KMS 11, which returns unforked keys to the receiver 10, which the receiver 10 uses to check the Transfer Resp message and generate e2e media protection keys. The receiver 10 can then receive the data from the intermediate node 9 and decrypt it using the e2e media protection keys.

Figure 5:
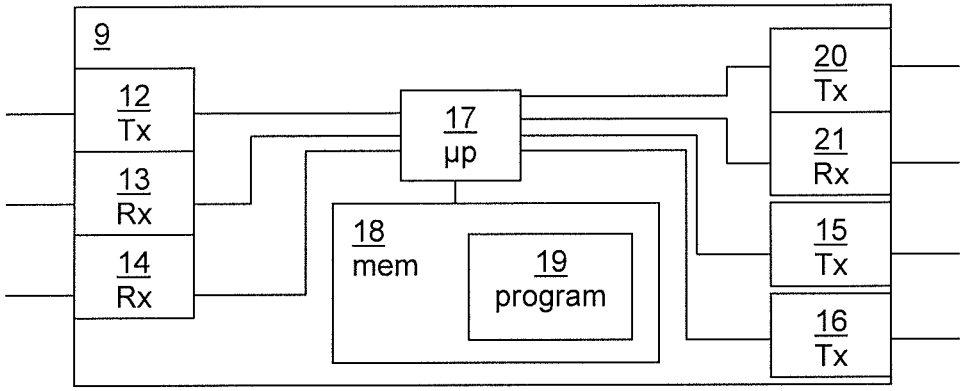
FIG. 5 illustrates schematically in a block diagram an intermediate unit according to an embodiment of the invention.

Referring to FIG. 5, there is shown an intermediate unit 9 as described above. The intermediate unit is provided with a first transmitter 12 for sending the Transfer Init message to the sender 8. A first receiver 13 is provided for receiving the transfer response message from the sender 8. A second receiver 14 is provided for receiving data from the sender 8 once the data has been protected using encryption keys associated with the ticket and obtained from the KMS. A second transmitter 15 is provided for information required to decrypt the protected data to the receiver 10, and a third transmitter 16 is provided for sending the protected data to the receiver 10. Of course, the receivers and transmitters can be embodied in one or more physical receiver and transmitters, or in one or more transceivers. A processor 17 is provided for controlling the operation of the intermediate unit 9. A computer readable medium in the form of a memory 18 is also provided on which may be stored a computer program 19 which, when run using the processor, causes the intermediate unit 9 to behave as described above.

Where the intermediate node 9 is used for the method illustrated in FIG. 4, it is also provided with a fourth transmitter 20 for sending a ticket request to the KMS 11, and a third receiver 21 for receiving a ticket response from the KMS 11, the ticket response including the Ticket.

Figure 6:
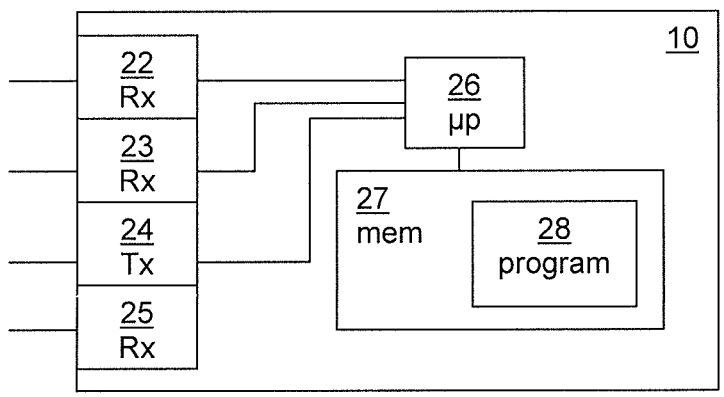
FIG. 6 illustrates schematically in a block diagram a receiver unit according to an embodiment of the invention.

Referring to FIG. 6, there is shown a receiver unit 10. The receiver unit 10 is provided with a first receiver 22 for receiving a message including a ticket associated with the receiver unit 10 from the intermediate node 9. A second receiver 23 is provided for receiving protected data from the intermediate unit 9. A transmitter 24 is provided for sending a ticket request message to the KMS 11. A third receiver 25 is provided for receiving a response message from the KMS, the resolve response message including the encryption keys, and a processor 26 is provided for decrypting the protected data. The receivers and transmitters can be embodied in one or more physical receiver and transmitters, or in one or more transceivers. A computer readable medium in the form of a memory 27 is also provided on which may be stored a computer program 28 which, when run using the processor, causes the receiver unit 10 to behave as described above.

Figure 7:
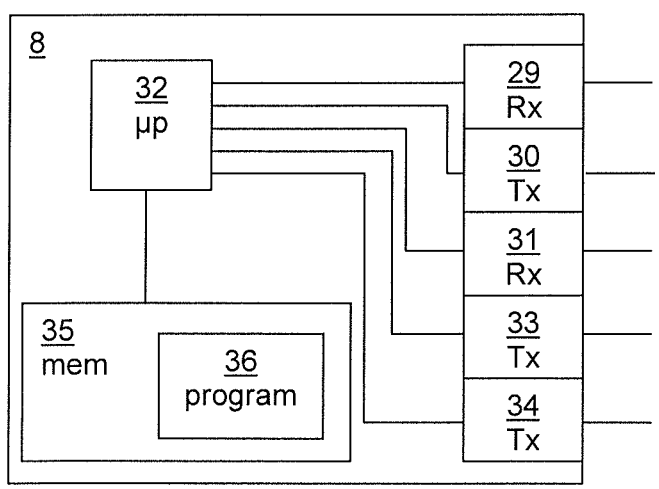
FIG. 7 illustrates schematically in a block diagram a sender unit according to an embodiment of the invention.

Turning now to FIG. 7, sender unit 8 is shown. The sender unit 8 is provided with a first receiver 29 for receiving the Transfer Init message from the intermediate unit 9. A first transmitter 30 is provided for sending the resolve request message to the KMS 11, and a second receiver 31 is provided for receiving the resolve response that includes the encryption keys associated with the ticket. A processor 32 is provided for protecting data using the encryption key, and a second transmitter 33 is provided for sending a transfer response message to the intermediate unit 9. A third transmitter 34 is provided for sending the protected data to the intermediate unit 9. The receivers and transmitters can be embodied in one or more physical receiver and transmitters, or in one or more transceivers. A computer readable medium in the form of a memory 35 is also provided on which may be stored a computer program 36 which, when run using the processor, causes the sender unit 8 to behave as described above.

The invention provides an efficient MIKEY-TICKET based key management solution for store and forward applications. It will be appreciated by the person of skill in the art that various modifications may be made to the above-described embodiments without departing from the scope of the present invention as defined in the appended claims. For example, the above description is with reference to an IMS network, but the invention can work with other types of networks such as Intelligent Network (IN), H.323 and so on.

The following abbreviations have been use in this description:
3GPP Third Generation Partnership Project
CSB Crypto Session Bundle
CSCF Call/Session Control Function
e2e end to end
GGSN Gateway GPRS support node
GPRS General Packet Radio Service
GSNs GPRS Support Node
I-CSCF Interrogating CSCF
IDRi Initiator payload
IDRr Responder payload
IP-CAN IP-Connectivity Access Network
IMS IP Multimedia Subsystem
KMS Key Management Server
MPK MIKEY Protection Key
P-CSCF Proxy CSCF
S-CSCF Serving CS CF
SDP Session Description Protocol
SIP Session Initiation Protocol
TEK Traffic Encryption Key
TGK TEK Generation Key
UE User Equipment

The invention claimed is:

1. A method of sending protected data from a sender unit to a receiver unit via an intermediate unit, the method comprising, at the intermediate unit:
   sending to the sender unit a Transfer Init message, the Transfer Init message containing a ticket associated with the receiver unit;
   receiving a transfer response message from the sender unit;
   receiving data from the sender unit, the data being protected using at least one security key associated with the ticket and obtained from a Key Management Server, separate and distinct from the intermediate unit;
   sending to the receiver unit a message, the message including information required for security processing of the protected data, wherein the information sent from the intermediate unit and required for security processing of the protected data includes information required to generate the at least one security key; and
   sending the protected data to the receiver unit.

2. The method according to claim 1, wherein the sender unit, after receiving the Transfer Init message, sends a resolve request message to the Key Management Server, the resolve request message requesting the Key Management Server to resolve the security key associated with the ticket; and the sender unit subsequently receives a resolve response message from the Key Management Server, the resolve response message including the security key associated with the ticket.

3. The method according to claim 1, wherein the receiver unit sends a ticket resolve message to the Key Management Server, and the receiver unit subsequently receives a resolve response message from the Key Management Server, the resolve response message including the security key.

4. The method according to claim 1, further comprising, prior to the intermediate unit sending the Transfer Init message to the sender unit:

the receiver unit sending a ticket request message to the Key Management Server, the ticket request message including an identity associated with the sender unit;

the receiver unit receiving, from the Key Management Server in response to the ticket request message, the ticket associated with the receiver unit and the security key; and the receiver unit generating the Transfer Init message containing the ticket associated with the receiver unit, and sending the Transfer Init message to the intermediate unit.

5. The method according to claim 4, further comprising sending in the ticket request message an indication that the ticket is to be used for a store-and-forward application.

6. The method according to claim 4, further comprising binding the ticket to the intermediate unit.

7. The method according to claim 1, further comprising, prior to the intermediate unit sending the Transfer Init message to the sender unit:

at the receiver unit, generating the ticket and security keys;

at the receiver unit, generating the Transfer Init message, and sending the Transfer Init message to the intermediate unit.

8. The method according to claim 1, wherein the Key Management Server receives a ticket resolve message from the receiver unit, and determines that a Responder payload in the ticket resolve message corresponds with an Initiator payload in the ticket and, as a result, sends a resolve response message to the receiver unit, the resolve response message including unforked security keys.

9. The method according to claim 1, further comprising, prior to the intermediate unit sending the Transfer Init message to the sender unit, at the intermediate unit:

sending a ticket request message to the Key Management Server for the ticket, the ticket request message including an identity of the sender unit and an indicator that the intermediate unit is entitled to request a ticket on behalf of the receiver unit;

receiving the ticket from the Key Management Server.

10. The method according to claim 1, wherein security processing comprises processing selected from any of decryption of the protected data and verification of the protected data.

11. The method of claim 1, wherein the message is a modified transfer response message.

12. The method of claim 1, wherein the message is the Transfer Init message together with a newly generated transfer response message.

13. An intermediate unit for receiving protected data on behalf of a receiver unit and sent from a sender unit, in a communication network, the intermediate unit comprising:

a first transmitter for sending to the sender unit a Transfer Init message, the Transfer Init message containing a ticket associated with the receiver unit;

a first receiver for receiving a transfer response message from the sender unit;

a second receiver for receiving data from the sender unit, the data being protected using a security key associated with the ticket and obtained from a Key Management Server, a second transmitter for sending to the receiver unit a message, the message including information required for security processing of the protected data; and a third transmitter for sending the protected data to the receiver unit.

14. The intermediate unit according to claim 13, further comprising:

a fourth transmitter for sending a ticket request message to the Key Management Server for the ticket, the ticket request message including an identity of the sender unit and an indicator that the intermediate unit is entitled to request a ticket on behalf of the receiver unit; and a third receiver for receiving the ticket from the Key Management Server.

15. A receiver unit for use in a communication network in which a sender unit sends protected data to the receiver unit via an intermediate unit, the receiver unit comprising:

a first receiver for receiving from the intermediate unit a message including a ticket associated with the receiver unit wherein the message includes information, sent from the intermediate unit and required for security processing of the protected data, required to generate at least one security key;

a second receiver for receiving from the intermediate unit the protected data;

a transmitter for sending a request message to a Key Management Server;

a third receiver for receiving a response message from the Key Management Server, the response message including security keys; and a processor for applying a security processing to the protected data.

16. A sender unit for use in a communication network in which the sender unit sends protected data to a receiver unit via an intermediate unit, the sender unit comprising:

a first receiver for receiving from the intermediate unit a Transfer Init message, the Transfer Init message containing a ticket associated with the receiver unit;

a first transmitter for sending a resolve request message to a Key Management Server, the resolve request message requesting the Key Management Server to resolve a security key associated with the ticket;

a second receiver for receiving from the Key Management Server a resolve response message, the resolve response message including a security key associated with the ticket;

a processor for protecting data using the security key;

a second transmitter for sending a transfer response message to the intermediate unit, the transfer response message including the ticket, wherein the intermediate unit sends a message including information required to generate a key, based on receiving the transfer response message;

a third transmitter for sending the protected data to the intermediate unit.

17. A non-transitory computer readable storage medium having instructions stored thereon, which when executed by an intermediate unit, causes the intermediate unit to perform a method of sending protected data from a sender unit to a receiver unit via the intermediate unit, the method comprising:
- sending to the sender unit a Transfer Init message, the Transfer Init message containing a ticket associated with the receiver unit;
- receiving a transfer response message from the sender unit;
- receiving data from the sender unit, the data being protected using at least one security key associated with the ticket and obtained from a Key Management Server;
- sending to the receiver unit a message, the message including information required for security processing of the protected data, wherein the message includes the information sent from the intermediate unit and required to generate the at least one security key; and
- sending the protected data to the receiver unit.

18. A non-transitory computer readable storage medium having instructions stored thereon, which when executed by a receiver unit, causes the receiver unit to perform a method comprising:
- receiving, from the intermediate unit, a message including a ticket associated with the receiver unit, wherein the message sent from the intermediate unit and required for security processing of protected data includes information required to generate at least one security key;
- receiving, from the intermediate unit, the protected data;
- transmitting a request message to a Key Management Server,
- receiving a response message from the Key Management Server, the response message including security keys; and
- a processor to apply a security processing to the protected data.

19. A non-transitory computer readable storage medium having instructions stored thereon, which when executed by a sender unit, causes the sender unit to perform a method comprising:
- receiving, from the intermediate unit, a Transfer Init message, the Transfer Init message containing a ticket associated with the receiver unit;
- transmitting a resolve request message to a Key Management Server, the resolve request message requesting the Key Management Server to resolve a security key associated with the ticket;
- receiving, from the Key Management Server, a resolve response message, the resolve response message including a security key associated with the ticket;
- protecting data using the security key;
- transmitting a transfer response message to the intermediate unit, the transfer response message including the ticket, wherein the intermediate unit sends a message including information required to generate a key based on receiving the transfer response message; and
- transmitting the protected data to the intermediate unit.

* * * * *